UNITED STATES PATENT OFFICE.

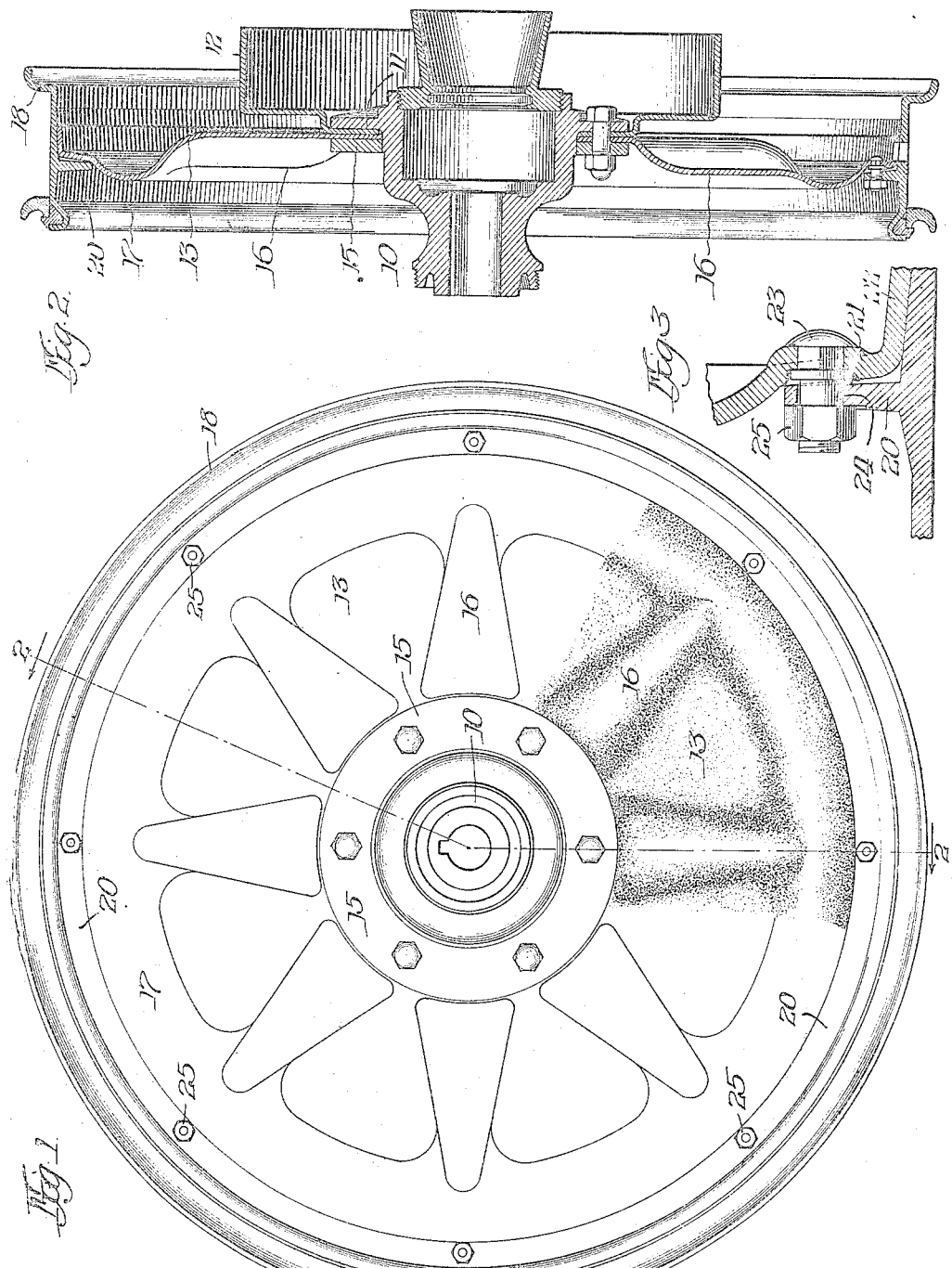

JOSEPH G. SWAIN, OF AKRON, OHIO, ASSIGNOR, BY MESNE ASSIGNMENTS, TO THE FIRESTONE STEEL PRODUCTS COMPANY, OF AKRON, OHIO, A CORPORATION OF OHIO.

PRESSED-STEEL WHEEL.

1,400,837.   Specification of Letters Patent.   Patented Dec. 20, 1921.

Application filed March 15, 1918. Serial No. 222,617.

*To all whom it may concern:*

Be it known that I, JOSEPH G. SWAIN, a citizen of the United States, residing at Akron, in the county of Summit, State of Ohio, have invented certain new and useful Improvements in Pressed-Steel Wheels, of which the following is a specification.

It is the purpose of this invention to design and construct a wheel of general utility from a pressed steel disk to replace the usual spokes and felly. The wheel is adapted for all purposes but particularly for the reception of a demountable rim adapted to carry a resilient tire and designed particularly for use on automobiles, trucks or similar vehicles. The wheel possesses novel features of construction which make it slightly resilient in all directions and in this respect is superior to the ordinary wood wheel and also to disk wheels of types heretofore constructed. While I have shown but a single disk wheel I do not desire to be limited to this construction, as it is possible to place two of these disks face to face in such manner as to make a heavier wheel for dual service, and such construction is intended to be within the scope of the claims.

This application is a continuation in part of my co-pending application Serial No. 211,483, filed January 12, 1918.

In the drawing accompanying these specifications I have shown one form of my improved steel wheel with a demountable rim carried thereon, in which—

Figure 1 is a side elevation of the wheel.

Fig. 2 the cross-section on line 2—2 of Fig. 1, and

Fig. 3 is an enlarged detail of a portion of the disk showing the manner in which the demountable rim is clamped thereto.

Although I have shown only one form of my pressed steel wheel, I do not intend to be limited to this form alone but my invention broadly covers such improvements as are within the scope of the appended claims.

The pressed steel wheel of this invention comprises a hub 10, which may be made of any preferred construction and with which is formed an integral flange 11, adjacent which may be mounted a brake drum 12 if the wheel is intended for the rear of the vehicle. This brake drum may of course be omitted if desired.

The disk which forms the body of the wheel and is intended to replace the ordinarily felly and spokes is designated generally by the numeral 13, is annular in form and fits about the hub portion, being held to the flange 11 by bolts 14, which clamp the disk between the flange and a ring 15 placed opposite the flange. At spaced intervals about the disks is provided series of concavo-convex radial spoke-like formations or ribs designated by the numeral 16, these formations tapering toward the edge of the disk and merging into a circumferential concavo-convex rib 17. This circumferential rib is preferably placed about the outer edge of the disk in a position usually occupied by the felly, but it may be placed at any point in the disk. The circumferential rib gives a desirable degree of resiliency which is not present in a smoothly dished wheel, while the radial ribs joining the circumferential rib serve to properly limit this resiliency.

It will be noted by an inspection of Fig. 2 that the outer edge of the disk is offset from the plane of the inner edge thereof. This construction gives the disk as a whole a "dished" effect although the disk is not dished throughout in the ordinary use of the term. It will be observed that the major portion of the disk between the radial ribs or spoke formations is in a plane parallel to the plane of rotation of the wheel. It is my belief that this construction gives all of the benefits arising from the present well known dished construction and secures a double dished effect due to the location of a part of the major portion of the disk at the side of a line drawn from the outer edge of the disk to the inner edge thereof opposite to that occupied by the ribs 16, besides some additional benefits which are not present in that construction.

A demountable rim 18 is secured to the periphery of the disk, the rim being of any preferred type although in the drawing I have shown that type known as quick detachable. The inner surface of the rim is formed with a flange 20 which is tapered on the side toward the wheel, as will be better seen in Fig. 3. The outer edge of the disk wheel is formed with a flattened portion 21 having a slightly greater degree of taper than the side of the flange 20 which faces it. The periphery of the disk is pressed backwardly to form a flange 22 against which the under-side of the flange 20 may be pressed. In the portion 21 to the wheel there is secured by any suitable means, bolts 23. In the construction here shown the bolts are riveted in place on the wheel and passed through apertures 24 in the flange formed on the rim, nuts 25 serving to hold the rim in place.

It will be noted that the circumferential rib is preferably located entirely within the outside limits or planes of the outer edges of the rim. By this construction the load is transmitted through the rim to the hub of the wheel without excessive spring and without danger of fracture around the circumferential rib.

From the construction shown more particularly in Fig. 3 it will be seen that the demountable rim is adapted to be wedged onto the outer edge of the disk, and it will be further noted that the taper of the part 21 is slightly greater than the taper of the part 20. By this means a tight clamping relation is obtained between the rim and the wheel, the inner edge of the flange 20 being brought to bear against the wheel first and a subsequent tightening of the nuts 25 serving to wedge the two into intimate relation.

In previous construction of disk wheels it has been the universal practice to divide the rim along a circumferential line. This construction is not as desirable as one in which the rim base is integral. By my construction, I am enabled to use the well known types of quick detachable rims and it is also possible to mount on my wheel rims of the transversely split type.

By the formation of the radial ribs 16 and the circumferential rib 17, the wheel is given a degree of resiliency both laterally and radially which is very efficient and adds materially to the life of the tires. Although the wheel is not dished, throughout its entire body the fact that the outer edge of the disk is off-set from the inner edge of the disk, causes the wheel as a whole to be dished and to retain all of the beneficial results flowing from the well known dished construction and to possess superior qualities of resilience and strength.

I claim:

1. In a wheel structure, the combination with the hub and the rim, of a sheet metal disk secured to the hub, its middle portion extending forwardly and being formed with a concave portion, and its outer portion being reversely bent to form a flange portion adapted to support the rim, the portion at the hub and the concave portion being on opposite sides of the median line of the wheel, and releasable means to hold the rim on the flange portion of the wheel.

2. In a wheel structure, the combination with the hub and the rim, of a sheet metal disk secured to the hub, its middle portion extending forwardly and being formed with a concave portion and its outer portion being reversely bent to form a tapering flange, a tapered surface on the underside of said rim adapted to seat on said flange, the portion at the hub and the concave portion being on opposite sides of the median line of the wheel, and releasable means to hold the rim on the flange.

JOSEPH G. SWAIN.